United States Patent
Song et al.

[11] Patent Number: 5,935,643
[45] Date of Patent: Aug. 10, 1999

[54] METHOD FOR MANUFACTURING ELECTRODE FOR FUEL CELL

[75] Inventors: Rak-Hyun Song; Dong-Ryul Shin; Chang-Soo Kim; Byung-Rok Lee, all of Taejon, Rep. of Korea

[73] Assignee: Korea Institute of Energy Research, Taejon, Rep. of Korea

[21] Appl. No.: 08/991,336

[22] Filed: Dec. 16, 1997

[30] Foreign Application Priority Data

Apr. 18, 1997 [KR]  Rep. of Korea ..................... 97-014351

[51] Int. Cl.⁶ ..................................................... B05D 5/12
[52] U.S. Cl. .......................... 427/115; 427/365; 427/600; 429/41; 429/43; 429/44; 29/623.1; 502/101; 502/185
[58] Field of Search ..................................... 427/115, 365, 427/366, 600; 429/40–44; 29/623.1; 502/101, 185

[56] References Cited

U.S. PATENT DOCUMENTS

| | | | |
|---|---|---|---|
| 4,163,811 | 8/1979 | Kohmayr et al. | 427/115 |
| 4,603,060 | 7/1986 | Mitsuda et al. | 427/115 |
| 4,849,253 | 7/1989 | Maricle et al. | 427/115 |
| 4,894,355 | 1/1990 | Takeuchi et al. | 429/42 |
| 5,395,705 | 3/1995 | Door et al. | 429/42 |
| 5,716,437 | 2/1998 | Denton et al. | 204/291 |

*Primary Examiner*—Brian K. Talbot
*Attorney, Agent, or Firm*—Bacon & Thomas

[57] ABSTRACT

There is disclosed a method for manufacturing an electrode for phosphate type fuel cells, utilizing a combination of a coating process and a rolling process. Carbon paper is waterproofed to give an electrode support. Separately, platinum-dispersed carbon powder (Pt/C) is added in a solvent and mechanically stirred to give a homogeneous mixture which is, then, added with a PTFE emulsion at an amount of about 40–55 wt % and stirred. Another stirring is executed in the presence of a bridge-builder and a peptization agent, to produce an electrocatalyst layer slurry. Using a coating apparatus, the electrocatalyst slurry is coated upon the electrode support in a uniform thickness. The resulting structure is dried for 30 min in an inert atmosphere of 225° C. to completely remove the solvent from the catalyst layer, passed through a rolling apparatus and subjected to sintering for 30 min in an inert atmosphere of 350° C., to produce the electrode. It exhibits the advantages of few cracks in the electrocatalyst layer and strong adhesiveness between the electrode support and the electrocatalyst layer.

8 Claims, 3 Drawing Sheets

5,935,643

METHOD FOR MANUFACTURING ELECTRODE FOR FUEL CELL

BACKGROUND OF THE INVENTION

1. Field of the Invention

The present invention relates, in general, to a method for manufacturing an electrode for phosphate type fuel cells and, more particularly, to the use of a combination of a coating process and a rolling process in manufacturing an electrode, which exhibits the advantages of few cracks in an electrocatalyst layer and strong adhesiveness between an electrode support and the electrocatalyst layer in a phosphate type fuel cell.

2. Description of the Prior Art

Generally, fuel cells produce clear electricity with high efficiency, in which the hydrogen contained in hydrocarbon fuels, such as methanol or natural gas, and the oxygen in the air are directly converted to electric energy through an electrochemical reaction. Fuel cells were first developed as a power supply for space crafts in U.S.A. in the 1970's, since when dynamic research and development have been directed to applying the fuel cells for general use. Currently, developed countries including U.S.A. and Japan are actively making an effort to put them to practical use (see, J. Appleby, "Assessment of research needs for advanced fuel cell", Energy Inter. J. vol.11. no. 1/2. pp. 13–94, 1986).

Fuel cells are largely classified into three groups: phosphate type; molten carbonate type; and solid electrolyte type. Of them, the phosphate type fuel cell is the most advanced in the research and development for practical use.

The main body of a phosphate type fuel cell consists of unit cells, each comprising a phosphate-impregnated electrolyte layer to the opposite sides of which a cathode and an anode are attached. A fuel cell electricity generation system with a capacity of several hundred kilowatts to several megawatts can be built up by stacking such unit cells in a multi-layer manner.

The capability of a phosphate type fuel cell is dependent on the electrochemical properties of its elements. Of them, especially, electrodes are known to determine most of the capability of the fuel cell.

Having a great influence upon a fuel cell's capability of producing electricity, an electrode of a phosphate type fuel cell consists of an electrode support and an electrocatalyst layer. The electrode support is formed of porous carbon paper and the electrocatalyst layer is a porous gas diffusion electrocatalyst layer in which carbon particles coated with fine platinum powder are joined with each other by polytetrafluoroethylene (PTFE) particles.

While the electrode support plays a role of supplying the reactant gases such as hydrogen and oxygen to the electrocatalyst layer, the electrochemical reaction of the fuel cell occurs in the electrocatalyst layer.

There are well-known two processes for manufacturing a phosphate type fuel cell; coating process and rolling process. In order to better understand the background of the invention, a description will be given of the processes, below.

First, according to a coating process, as disclosed in Japanese Pat. Laid-Open Publication No. Heisei 7-22035,an electrode is obtained by forming an electrode support and an electrocatalyst layer slurry on the electrode support and coating the catalyst layer. The manufacture of an electrode is completed by drying and sintering the electrode.

This conventional coating process of manufacturing an electrode of a phosphate type fuel cell has a major disadvantage that an abundance of cracks occur in the catalyst layer during the drying and sintering. An appropriate number of cracks formed in the catalyst layer may improve the performance of a fuel cell but a large number of cracks in the catalyst layer cause phosphate electrolyte to flood into the catalyst, greatly deteriorating the performance of the fuel cell.

It is preferable to prevent the occurrence of cracks in the catalyst layer as to a maximal extent as possible but the coating process has a great difficulty in restraining an abundance of cracks.

Further, another significant problem of the conventional coating process is that, because the force with which the carbon particles within the electrocatalyst layer attract themselves and the binding strength between the electrode support and the electrocatalyst layer are very weak, the electrocatalyst layer readily separates from the electrode support.

U.S. Pat. No. 4,603,060 discloses a rolling process of manufacturing an electrode of a phosphate type fuel cell. First, a modification is done to make a gum-like catalyst layer slurry, which is formed into a sheet type catalyst layer by use of a roll. This sheet type catalyst layer is attached to an electrode support by using a press, to give the electrode.

As mentioned, the gum-like catalyst layer is made sheet-like in advance but it is difficult to make the catalyst layer wide and uniform in thickness. In addition, a press with a wide area is required to attach the wide catalyst layer to the electrode support.

Particularly, when pressing the electrocatalyst layer upon the electrode support, a uniform stress must be applied over all the surface of the catalyst layer. If there is an application of non-uniform stress, the catalyst layer is, in part, delaminated. In practice, the manufacture of a press capable of applying wide and uniform stress is accompanied by great economical and technical difficulty.

SUMMARY OF THE INVENTION

Therefore, it is an object of the present invention to overcome such problems as are encountered in the conventional coating process and rolling process and to provide a method for manufacturing an electrode for phosphate type fuel cells by taking advantage of the coating process and rolling process.

In accordance with the present invention, an electrocatalyst slurry which is prepare in subsequent two mixing processes is coated upon an electrode support which is obtained by waterproofing and sintering carbon paper, dried at a high temperature in an inert atmosphere and subjected to a rolling process and then, to a sintering process.

BRIEF DESCRIPTION OF THE DRAWINGS

Other objects and aspects of the invention will become apparent from the following description of embodiments with reference to the accompanying drawings in which.

DETAILED DESCRIPTION OF THE INVENTION

Figure 1:
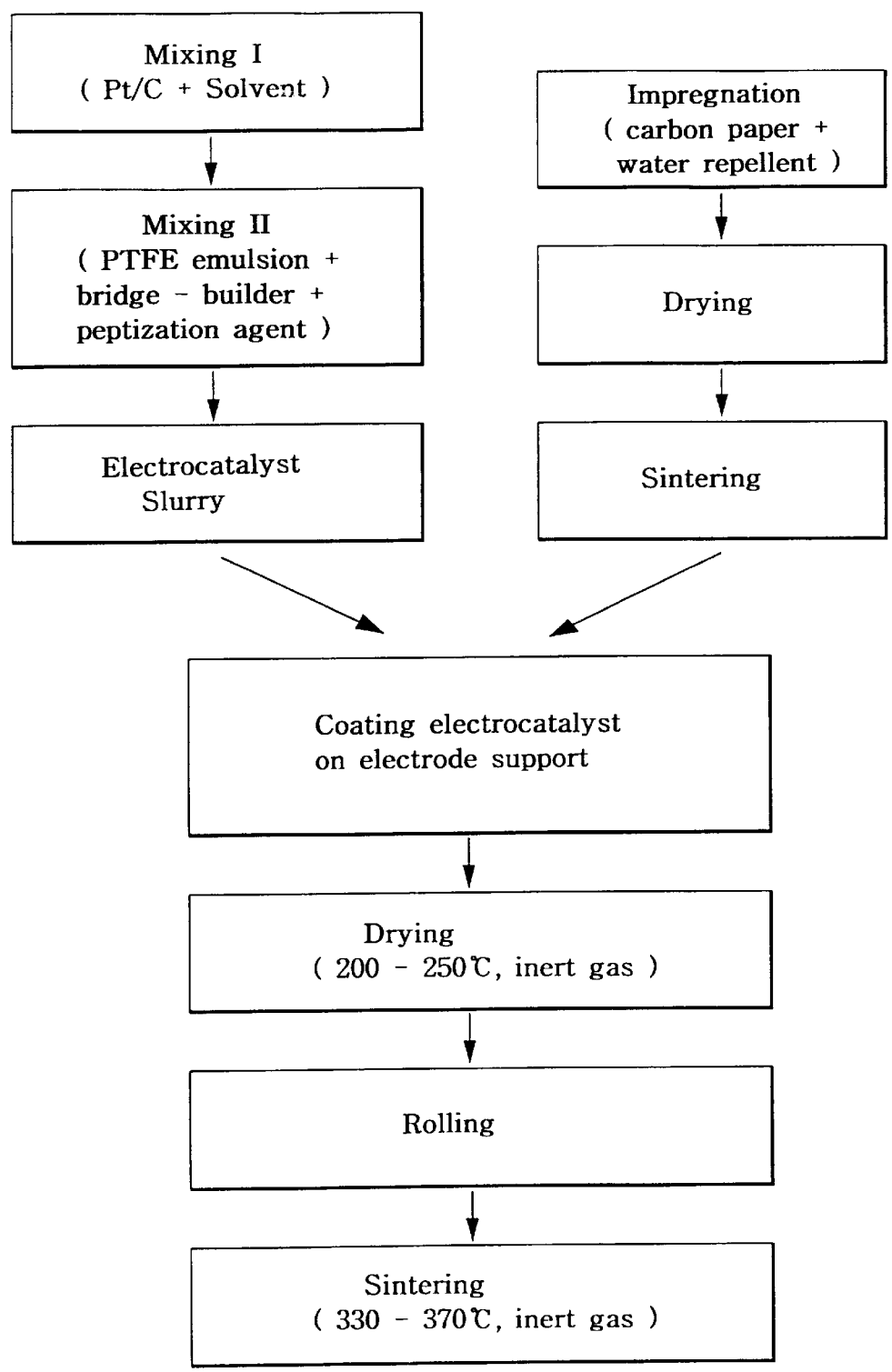
FIG. 1 is a flow chart illustrating the manufacturing processes of an electrode for phosphate type fuel cells, according to the present invention.

The application of the preferred embodiments of the present invention is best understood with reference to the accompanying drawings, wherein like reference numerals are used for like and corresponding parts, respectively.

FIG. 1 illustrates a method for manufacturing an electrode of a fuel cell, according to the present invention.

An electrode catalyst slurry and an electrode support are prepared in separate ways. For the electrode support, carbon paper is waterproofed by immersing it in a waterproofing solution mixed with water, drying in the air, and sintering at a high temperature. The waterproofing of the carbon paper has an aim of preventing phosphate electrolytes or water from infiltrating into the carbon paper and from closing the pores of the carbon paper. The preparation of the electrode support is completed by the waterproofing.

As seen in FIG. 1, the electrocatalyst slurry is obtained via two mixing steps. In a first mixing step, platinum-dispersed carbon powder (Pt/C) is added in a solvent and mechanically stirred to give a homogeneous mixture. Subsequently, in a second step, the mixture is added with a PTFE emulsion and stirred by ultrasonication and then, by a machine in the presence of a bridge-builder and a peptization agent, to produce an electrocatalyst slurry.

Figure 2:
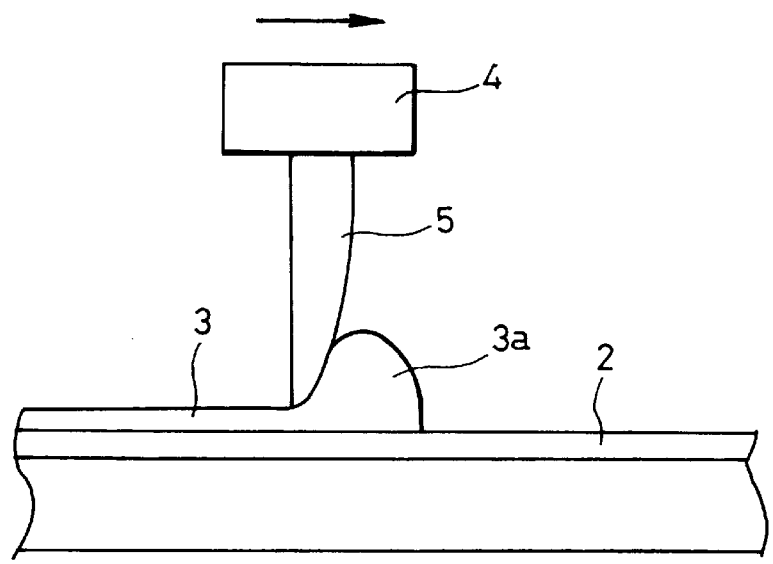
FIG. 2 is a view showing a coating process of an electrocatalyst layer in manufacturing the electrode of the invention.

In accordance with the present invention, the PTFE is added at an amount of about 40–55 wt % of the resulting electrocatalyst layer. Using a coating apparatus, the electrocatalyst slurry is coated upon the electrode support. This coating process is illustrated in FIG. 2. On a flat die 1 is fixed an electrode support 2, the waterproof carbon paper, on which a suitable amount of a catalyst layer slurry 3a is placed. The electrode support 2 is coated with an electrocatalyst layer 3 by running a coating blade 5 fixed to a traversing means 4 in a parallel motion with the flat die 1 as indicated by the arrow.

The thickness of the electrocatalyst layer 3 can be controlled by adjusting the height of the coating blade 5. The coating layer formed by a single run of the coating blade 5 should be less than 0.39 nm and preferably less than 0.13 mm in thickness.

The electrode obtained just after the electrocatalyst layer 3 is formed on the electrode support 2, is dried for a day in the air and then, for about 30 min in an inert atmosphere of 200–250° C. The drying temperature makes the solvent completely dried while the inert atmosphere prevents the platinum of the catalyst layer from being oxidized.

Figure 3:
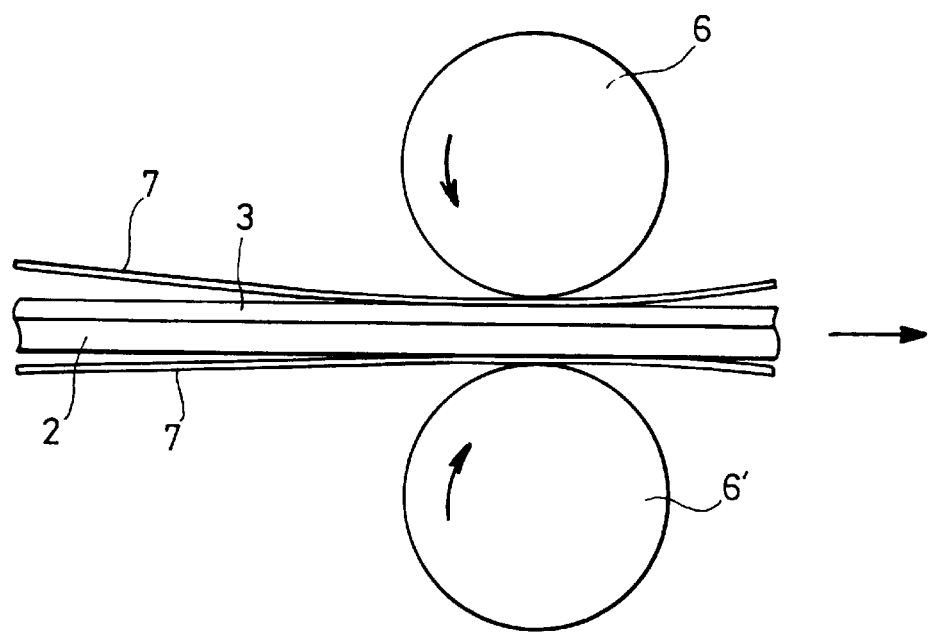
FIG. 3 is a view showing a rolling process in manufacturing the electrode of the invention.

With reference to FIG. 3, there is illustrated a rolling process for the dried electrode. This process is carried out by passing the dried electrode between two rolls 6 and 6' of a rolling apparatus, with the aim of modifying the PTFE included in the electrocatalyst layer 3 to prevent the occurrence of cracks in the catalyst layer 3 as well as of increasing the adhesiveness between the electrocatalyst layer 3 and the electrode support 2.

It is preferable to maintain the rolling gap, that is, the difference in the thicknesses of the electrode before and after the rolling, at about 40 $\mu$m. In order to prevent the electrode from sticking to the surfaces of the rolls 6 and 6' during the rolling process, the opposite sides of the electrode are preferably covered with thin protecting films 7 in advance of the rolling process.

Finally, the electrode passed between the rolls is subjected to sintering for 10–50 min at 330–370° C. and preferably at 350° C. in an inert atmosphere, to produce an electrode for a phosphate type fuel cell in accordance with the present invention.

The electrode obtained through the above-illustrated procedure of the invention exhibits the advantages of few cracks in the electrocatalyst layer and strong adhesiveness between the electrode support and the electrocatalyst layer.

A better understanding of the present invention may be obtained through the following example which is set forth to illustrate, but is not to be construed as the limit of the present invention.

EXAMPLE

A sheet of carbon paper with a dimension of 500 mm×600 mm was soaked in a waterproofing solution mixed with water for 30 min and dried in the air for a day. Then, the carbon paper was subjected to sintering at 370° C. for 20 min, to give a waterproof electrode support.

10 g of platinum-dispersed carbon powder with a platinum amount ranging from 10 to 30 wt %, was mechanically stirred for 30 min in 80 ml of a solvent to give a homogeneous mixture. This mixture was added with 13.6 g of PTFE emulsion and stirred by ultrasonication. Another mechanical stirring was executed for 30 min after adding 15 g of a bridge-builder and 15 g of a peptization agent, to give an electrocatalyst slurry.

This slurry was placed on the electrode support fixed on a flat die of a coating apparatus, coated thereon by running a coating blade in a parallel motion with the flat die, and dried in the air for a day. The solvent included in the electrocatalyst layer was completely removed by drying for 30 min in an inert atmosphere of 225° C.

Then, the electrode dried was transferred to a rolling apparatus, allowed to pass between two rotating rolls, and subjected to sintering in an inert atmosphere for 30 min at 350° C. which was a suitable temperature for PTFE, to produce an electrode for a phosphate type fuel cell.

A unit of a fuel cell was fabricated with the electrode and tested for the capacity of the electrode. The unit cell was constructed in such a way that an electrolyte layer was located between two electrodes whose electrocatalyst layers faced each other.

The electrolyte layer was prepared by impregnating a porous SiC paper sheet 0.1 mm thick with 105 wt % of phosphate. The electrode obtained was attached to each of the opposite sides of the electrolyte layer. The unit cell was tested for capability at an operating temperature of 190° C. while hydrogen gas was made to flow into one side of the cell and oxygen gas into the other side.

Figure 4:
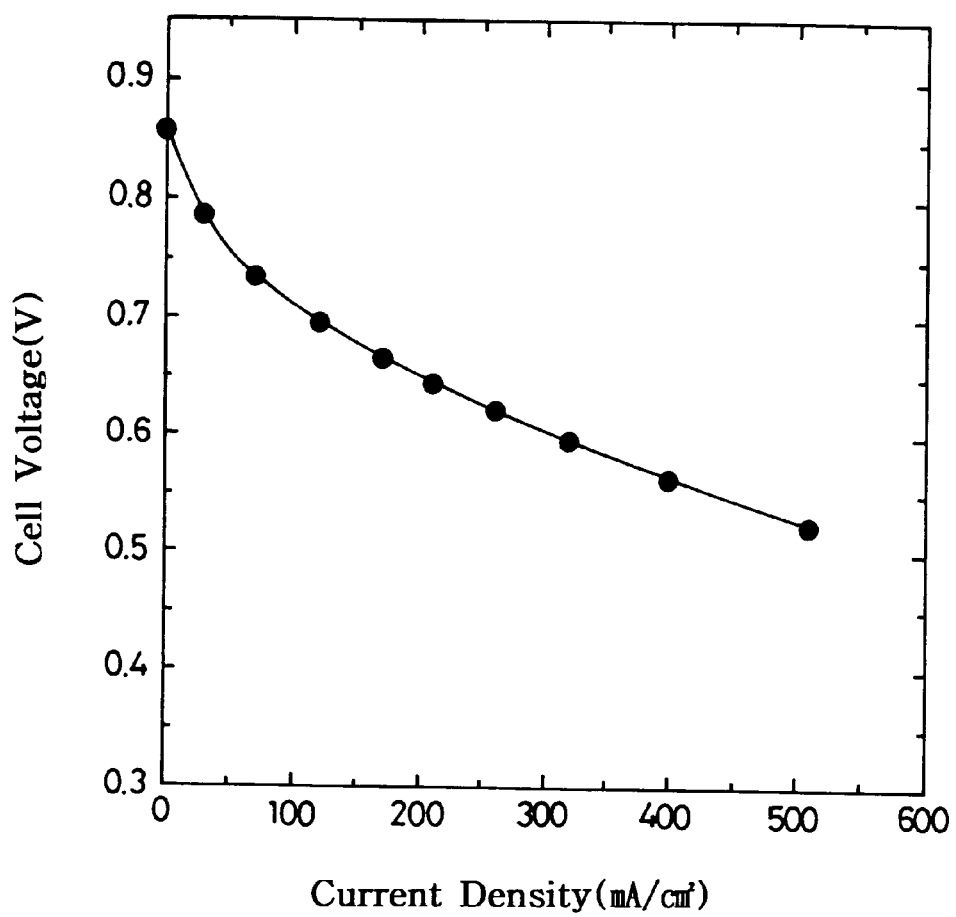
FIG. 4 is a plot showing an electrical property of the electrode manufactured in accordance with the invention.

FIG. 4 shows the test result of the electrode whose electrocatalyst layer comprises platinum at an amount of 20 wt %. As seen, the unit cell shows a capacity of 0.6 V. 300 mA/cm$^2$.

The thickness of the electrocatalyst layer was on the order of 30 $\mu$m and could be modulated by controlling the height of the coating blade or by repeating the steps of coating, drying and rolling prior to the sintering step.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A method for manufacturing an electrode for a fuel cell, comprising the steps of waterproofing carbon paper to give an electrode support, preparing an electrocatalyst slurry, coating the electrocatalyst slurry on the electrode support in a uniform thickness to form a layer of said electrocatalyst on said electrode support, drying the electrocatalyst layer on the electrode support at a temperature of 200–250° C. in an inert atmosphere to form a structure having a dried electrocatalyst layer adhered to said electrode support, passing the structure through a rolling apparatus, and then sintering the structure for 10–50 min in an inert atmosphere of 330–370° C.;

said electrocatalyst slurry being prepared by mixing platinum-dispersed carbon powder in a solvent to form a homogenous admixture, adding PTFE in the form of an emulsion to said admixture, ultrasonically stirring the admixture containing said PTFE emulsion to form an ultrasonically stirred admixture and then mechanically stirring said ultrasonically stirred admixture after adding peptization agent and bridge-builder thereto.

2. A method in accordance with claim 1, wherein said drying step is carried out at 225° C. for 30 min.

3. A method in accordance with claim 1, wherein said sintering step is carried out at 350° C. for 30 min.

4. A method in accordance with claim 1, wherein the structure is covered with a protective film at its opposite sides, prior to the rolling step.

5. A method in accordance with claim 1, wherein said electrocatalyst layer comprises polytetrafluoroethylene at an amount of about 45–50 wt %.

6. The method of claim 1 wherein the layer of said electrocatalyst on said electrode support is formed by depositing said electrocatalyst slurry on said electrode support and spreading said slurry by running a coating blade over said slurry whereby the thickness of said electrocatalyst layer is controllable by adjusting the height of the coating blade.

7. The method of claim 6 wherein a single ran of the coating blade is used to form the layer of electrocatalyst on said electrode support.

8. The method of claim 1 wherein said rolling apparatus is set to maintain a rolling gap wherein the difference in the thickness of the structure before and after rolling is 40 $\mu$m.

* * * * *